Oct. 11, 1960 W. W. SPOONER 2,955,696
ARTICLE SEPARATING MECHANISM
Filed Nov. 22, 1957 4 Sheets-Sheet 1

INVENTOR
WILLIAM WYCLIFFE SPOONER
BY
ATTORNEYS

Oct. 11, 1960    W. W. SPOONER    2,955,696
ARTICLE SEPARATING MECHANISM
Filed Nov. 22, 1957    4 Sheets-Sheet 2

INVENTOR
WILLIAM WYCLIFFE SPOONER
BY
Mead, Browne, Schuyler + Beveridge
ATTORNEYS Oct. 11, 1960 — W. W. SPOONER — 2,955,696
ARTICLE SEPARATING MECHANISM
Filed Nov. 22, 1957 — 4 Sheets-Sheet 4

INVENTOR
WILLIAM WYCLIFFE SPOONER
BY
ATTORNEYS

United States Patent Office

2,955,696
Patented Oct. 11, 1960

2,955,696

ARTICLE SEPARATING MECHANISM

William Wycliffe Spooner, Ilkley, England, assignor to The Spooner Dryer & Engineering Co. Limited, Ilkley, England Filed Nov. 22, 1957, Ser. No. 698,252

Claims priority, application Great Britain Jan. 31, 1957

13 Claims. (Cl. 198—30)

The present invention relates to apparatus for separating and delivering singly a plurality of rod-like articles and has particular application to the separation and delivery of welding rods to heat treatment apparatus for drying an extruded flux coating.

According to the present invention apparatus for separating and delivering singly a plurality of substantially uniform rod-like articles received in random groups or in bulk comprises conveying means including a plurality of spaced article receiving compartments each at least large enough to receive one of said articles, means for directing the articles towards the article receiving compartments, and two spaced pairs of profiled discharge cams projecting into the path of the articles when being moved by said conveying means for discharging from each article receiving compartment articles in excess of one so that each compartment can thereafter contain only one article and thereby deliver them singly.

Preferably the conveying means is upwardly inclined so that articles discharged from the article receiving compartments by the profiled discharge cams can fall away under the action of gravity. The angle of inclination should be as large as possible and in practice it has been found that a convenient angle is about 70°.

Preferably the conveying means comprises a pair of laterally spaced sprocket chains and a plurality of spaced L shaped members attached thereto to form said article receiving compartment.

The pairs of profiled discharge cams are preferably adjustable relatively to the path of the L shaped members, and thereby relatively to the path of articles when being conveyed by said conveying means. For a given size of compartment and article the cams are preferably positioned relatively to the path of the L shaped members so that the width of the portion of the path of the L shaped members not intersected by the cams is sufficiently large to permit the passage of a single article but not large enough to permit the passage of two or more articles abreast. In operation articles enter the article receiving compartments but since only a single column of articles or a single article can pass in the space between the cams and the outer boundary of the path of the L shaped member, after passage past the first of the two pairs of spaced cams only a single article or a single column of articles can remain in the compartment and articles in a column will re-arrange themselves in the compartment into line abreast such action being mainly due to the action of gravity as the conveying means is inclined vertically upwards. When the compartment passes the second of the two spaced pairs of profiled discharge cams in like manner the inner one of the articles in line abreast is engaged by the cam and pushes any other articles outwardly towards the outer boundary of the path of the L shaped member so that only a single article remains in the compartment.

Thus, it will be appreciated that by positioning the profiled discharge cams in relation to the path of the article receiving compartments so that they project into the path to a predetermined extent but leave unaffected a part of the path stretching inwardly from the outer boundary of the path of the L shaped members wide enough to allow each L shaped member to retain a single article or column of articles but not wide enough for two articles or two columns of articles abreast to be retained, the number of articles in an article receiving compartment can be successively reduced to one. If, for example, an article receiving compartment initially received four articles, these would probably be arranged two upon two, that is to say in two columns. As the compartment conveys the articles past the first of the two spaced pairs of cams, the articles nearer the bottom of the L shaped member are first engaged by the cams and all the articles are pushed outwardly towards the outer end of the limb of the L shaped member, so that the outer two articles are pushed off the limb of the L shaped member and only a single column of two articles remains in the compartment. As the compartment progresses, the upper of the two remaining articles is disengaged by the pair of cams and falls under the action of gravity towards the bottom of the L shaped member. The lower of the two remaining articles when disengaged by the cam will merely move under the action of gravity until it abuts the article nearer the bottom of the L shaped member. With further movement of the compartment, the article nearer the bottom of the L shaped member is engaged by the second pair of cams and is urged outwardly, thereby pushing the other remaining article off the end of the link of the L shaped member. There now remains only a single article in the compartment, and when this is disengaged by the second pair of cams, it will fall under the action of gravity towards the bottom of the L shaped member.

The articles may conveniently fall under the action of gravity towards a receiving station wherein they are received by the article receiving compartments of the conveying means, though under certain circumstances, in order to prevent the accumulation of too many articles at the receiving station, it may be desirable to provide an entry conveyor for conveying them to that station, and this conveyor can also serve to urge the articles towards and into the compartments. By providing a magnet, either permanent or energised, behind the conveying means in the region of the receiving station, magnetic articles can be attracted into the article receiving compartments, and any tendency of them to bounce in the compartments can be reduced, thereby permitting a faster rate of operation.

The articles are preferably delivered by the conveying means on to a delivery conveyor which may conveniently be in the form of two spaced chains having a predetermined relationship with the spacing of the L shaped article receiving compartments on the conveying means. The chains of the delivery conveyor are preferably maintained in synchronism with the conveying means so that the articles may be delivered on to adjacent or successive links in the chains of the delivery conveyor. Since a conventional sprocket chain presents an undulating surface, it is eminently suitable for receiving rod-like articles and it is preferable that the phase relationship between the delivery conveyor and the conveying means is such that the articles are deposited into the dales of the undulations of the delivery conveyor chains. This may conveniently be achieved by providing the conveying means with a downwardly inclined path which intersects a substantially horizontal path of the delivery conveyor.

The range of sizes of rod-like articles which can be handled by the apparatus is to some extent dependent upon the pitch of the chain of the delivery conveyor, since this will set a limit to the diameter of articles which can be received in successive dales of the undulations of the chains. For larger articles it is necessary that they be spaced further apart and deposited on alternate links of the chains, that is to say in alternate dales of the undulations of the chains. In order to effect this, the spacing of the L shaped members forming the article receiving compartments on the conveying means must be different. It has been found convenient to construct the apparatus in the form of a unit which can readily be interposed between a feeding conveyor supplying articles to be separated and spaced and a receiving conveyor which accepts separated and spaced articles for and conveys them to further processing as may be required. One such unit can be provided with a conveying means having L shaped members forming article receiving compartments spaced at the rate of one per link, whilst another can be provided, for example with conveying means with L shaped members forming article receiving compartments spaced at the rate of one per two links. Whilst such units would be interchangeable with one another as required, it is desirable that the delivery conveyor of each unit should be able to be maintained in synchronism and in register with the receiving conveyor, so that in the transfer of articles from one to the other, the spacing and alignment of the articles is not jeopardised. This can readily be achieved by arranging for the receiving conveyor to be in the form of spaced chains having the same pitch as the delivery conveyor, and by arranging for both the delivery and the receiving conveyor chains to pass around sprocket wheels of substantially the same diameter and in axial alignment with one another, so that a common key member may be associated with them to maintain the sprocket wheels in synchronism and in register with one another. Such key member may be in the form of a splined or polygonal shaft member which may be inserted axially through all four sprocket wheels.

The invention will be further described, by way of example, with reference to the accompanying drawings which illustrate an embodiment of the invention suitable for use in the manufacture of welding rods for interposition between an extrusion machine in which coatings are applied to rod electrodes and drying apparatus in which such coating is dried and bonded to the rods.

Figure 1:
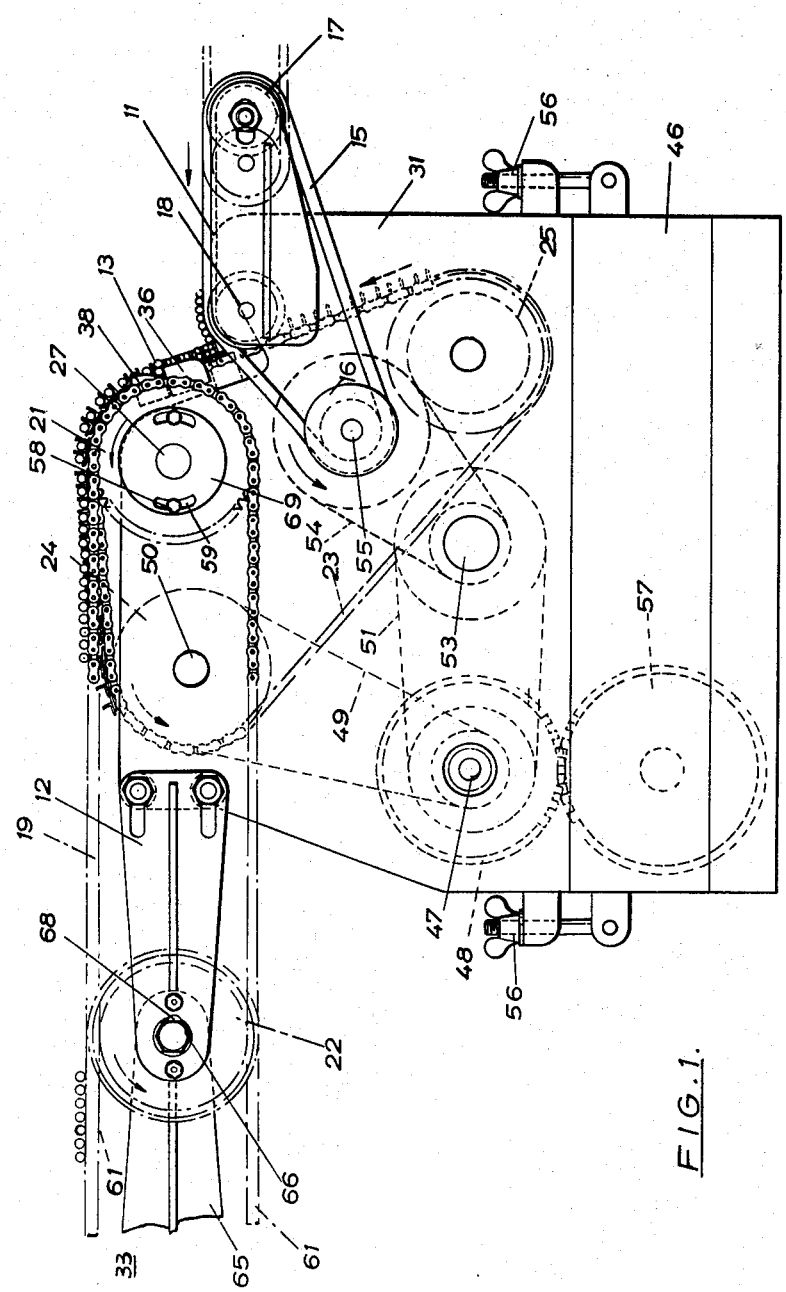
Fig. 1 is a side elevation of one embodiment of the invention.

The apparatus comprises an entry conveyor 11, a delivery conveyor 12 and conveying means 13 intersecting their paths. Entry conveyor 11 comprises a spaced pair of endless belts 14, 15, each passing round a driving wheel 16, a leading wheel 17, and an intermediate wheel 18. The delivery conveyor comprises a spaced pair of sprocket chains 19, each of which passes round a driving sprocket 21 and a trailing sprocket 22. The conveying means 13 intersecting the paths of the entry and delivery conveyors comprises two spaced sprocket chains 23 each of which pass round a driving sprocket 24, and an idler sprocket 25 and a sprocket 26 on a shaft 27 which also carries the sprockets 21 of the delivery conveyor 12. By arranging for the sprocket chains 19 and 23 to have the same pitch and for the sprocket wheels 21, 26 on the shaft 27 to have the same number of teeth the two pairs of chains can be arranged to move in synchronism with one another though it is desirable that the phase relationship between them can be adjusted as will hereinafter be described.

By arranging for the leading wheels 17 of the entry conveyor 11 and the trailing sprockets 22 of the delivery conveyor 12 to be carried on arms 29, 30 respectively extending from the sides of a framework 31, the apparatus can readily be interposed between the paths of a feeding conveyor indicated diagrammatically at 32 and a receiving conveyor indicated diagrammatically at 33 for delivering and taking away the articles.

Figure 2:
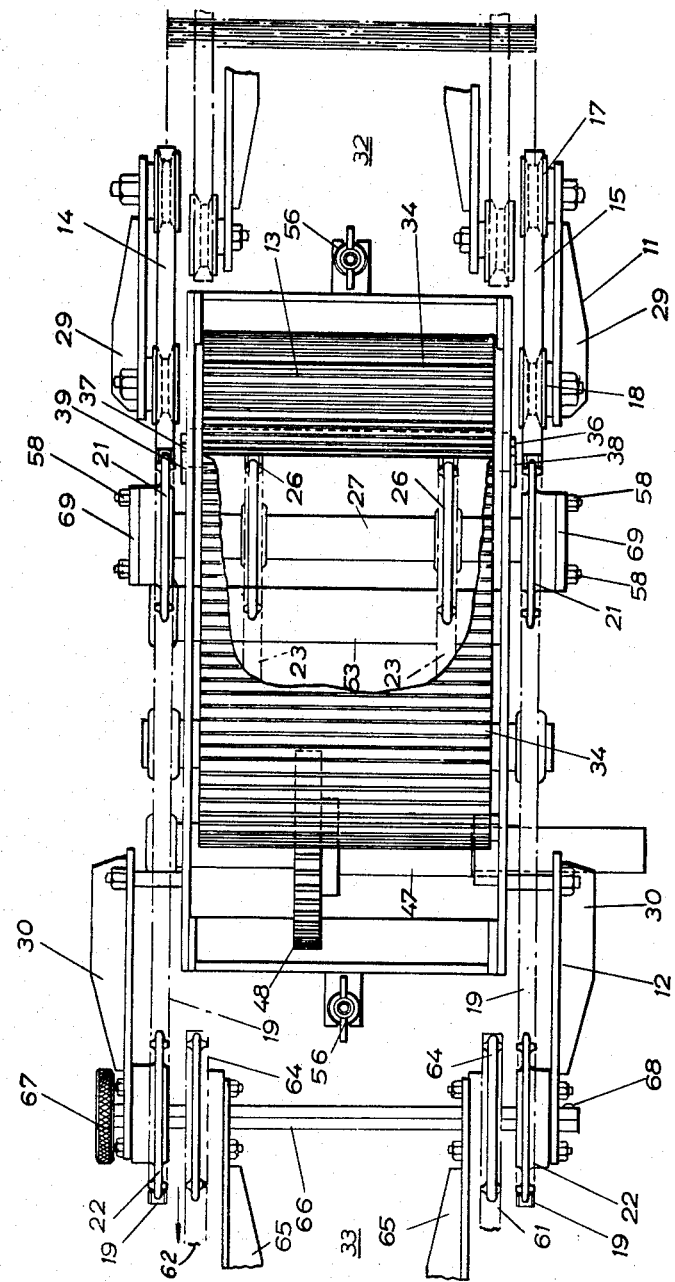
Fig. 2 is a plan view corresponding to Fig. 1.
Figure 3:
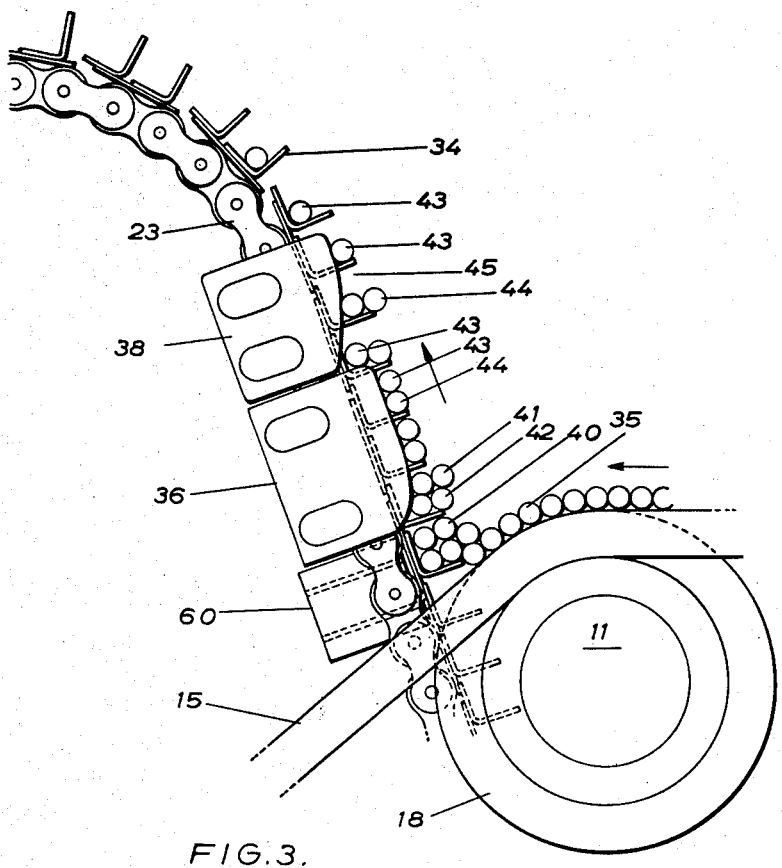
Fig. 3 is a detail view in an enlarged scale.

As may be more clearly seen from Fig. 3 the sprocket chains 23 of which only one is visible in Fig. 3 are provided with a plurality of L shaped members 34 in the form of angle members which may be seen from Fig. 2 extend from one sprocket chain 23 to the other and project slightly therebeyond. The L shaped members define a plurality of article receiving compartments. In the paths of the article receiving compartments are two pairs of profiled discharge cams 36 and 37 and 38 and 39.

The apparatus is constructed as a unit embodying the entry conveyor 11, the delivery conveyor 12 and the conveying means 13. The conveyors and conveying means are carried in the framework 31 which is detachably receivable on a base 46. The framework 31 carries a shaft 47 and a transmission including a sprocket chain 49 links the shaft 47 with a shaft 50 carrying sprockets 24 for the conveying means 13. The chains 23 of the conveying means 13 pass around sprocket wheels 26 on the shaft 27 and since the shaft 27 also carries the sprocket wheels 21 of the delivery conveyor 12, the chains of the conveying means 13 and of the delivery conveyor 12 remain in synchronism with one another. A shaft 55 carrying the driving pulleys of the entry conveyor 11 is linked to the shaft 47 through a transmission including a sprocket chain 51, an intermediate shaft 53 and a sprocket chain 54.

When the framework 31 is assembled in place on the base 46 it may be retained thereon by the wing nuts and bolts 56.

The separating of articles by the apparatus can best be understood with reference to Fig. 3.

Each of the pairs of profiled discharge cams projects into the path of the article receiving spaces such that the part of the path into which they do not project is only large enough to allow the passage of a single article so that some of the articles will be expelled and discharged from a compartment. For example, if as illustrated in Fig. 3 an article receiving compartment initially receives 4 articles, these will probably be arranged 2 upon 2 as illustrated at 40. As the compartment moves past the profiled discharge cams 36, 37 the outer two articles 41, 42 are pushed off the outer end of the limb of the L shaped member and fall down towards the entry conveyor 11 so that there only remains in the compartment the two inner articles 43, 44. As the compartment moves past the cam 36 the upper article 43 will move to the left and descend towards the bottom of the L shaped member and will later be engaged by the cams 38, 39 and caused to move outwardly so that as indicated at 45 the outer article 44 will be discharged and thereafter only the single article 43 will remain in the compartment.

The transfer of articles from the conveying means 13 to the delivery conveyor 12 can be conveniently effected by arranging for the path of the conveying means 13 to intersect or form an angle with part of the path of the delivery conveyor 12. As may be more clearly seen from Fig. 1, the conveying means 13, after passing around sprocket wheels 26, follows a slightly downwardly inclined path towards sprocket wheel 24, whereas the delivery conveyor 12, after passing round sprocket wheels 21 on shaft 27, which wheels have substantially the same diameter as wheels 26, follows a generally horizontal path towards sprocket wheels 22. The slight downward inclination of the path of the conveying means 13 will cause the articles in the article receiving compartments to roll forwards under the action of gravity, and since the bottom of an article receiving compartment is spaced somewhat above the level of a link in the chain 23, an article will have rolled forwards and downwards in the compartment before it has descended to the level of the links of the chains in the delivery conveyor. For this reason it is desirable that the phase relationship between the conveying means and the delivery conveyor should be adjustable, so that for a given size of article it can be substantially above a dale in the undulations of the chains of the delivery conveyor, that is to say substantially above the centres of corresponding links in the two chains of the delivery conveyor when it is engaged thereby. Such adjustment can be made by altering the position of the sprocket wheels 21 relatively to the shaft 27, and thus to the sprocket wheels 26, by means of nuts and bolts 58 securing sprocket wheels 21 to bosses 69 mounted on the shaft 27, the bolts cooperating with arcuate slots 59 in the bosses.

If the articles are magnetic, then their receipt by the article receiving compartments can be facilitated by providing a magnet 60 inside the conveying means 13 in the region of the intersection of the conveying means 13 with the entry conveyor 15. Thus, the articles may be urged into the compartments in the conveying means by magnet 60 and/or by the entry conveyor 11 and the presence of the magnet 60 can materially reduce any tendency of the articles to bounce in the compartments. If desired, for example in order to reduce the risk of damage to the articles particularly if they are provided with damage susceptible outer coverings, the lower pair of cams 36, 37 may extend downwardly below the positions illustrated in Fig. 3 and may enclose the intersection between the entry conveyor 11 and the conveying means 13, so that only a single column of articles can be picked up in an article receiving compartment of the conveying means 13.

The conveying means illustrated in Fig. 3 is provided with L shaped members 34 spaced corresponding to the spacing of the links of the chain 23, and as the chain 19 of the delivery conveyor has the same pitch as the chain 23, one article can be deposited on each link of the delivery conveyor 12. Thus, provided that the diameter of the articles is such in relation to the dimensions of the L shaped members 34 that at least one can be received in each article receiving compartment, a range of articles of differing diameters can be separated and delivered singly. The maximum size of article that can be handled by the apparatus is determined partly by the pitch of the chains 19, 23, and partly by the size of the article receiving compartments. To accommodate larger diameter articles, the conveying means 13 would need larger L shaped members 34 at wider spacing. Thus if the L shaped members 34 of the conveying means 13 were provided on a basis of one to each two links of the chains 23, not only would articles be delivered to alternate links of the chains 19 of the delivery conveyor 12 but also larger diameter articles could be dealt with. Moreover, if the L shaped members 34 were provided on a basis of one to every three links of the chains 23, then the articles would be delivered singly to every thirdl link of the chains 19. In order to cater for such possible variations in the desired spacing of the articles and/or such possible variations in the range of sizes of article to be handled, a plurality of interchangeable units may be employed, each unit embodying a framework 31, an entry conveyor 11, a delivery conveyor 12 and a conveying means 13 with associated driving transmissions therefor. One such unit might have L shaped members 34 provided on the basis of one per link of the chains 23, whilst another might have them provided on the basis of one per two links, and yet another one for every three links. By means of the wing nuts and bolts 56, such units could be readily interchangeable.

The receiving conveyor 33 may conveniently also be in the form of two spaced sprocket chains 61, and when handling rod-like articles it is desirable that these chains should be moving in synchronism with the chains 19 of the delivery conveyor 12, and should also be in phase or register with them so that an article which is resting in the depressions of two corresponding links in the chains 19 can be transferred into and taken up by the depressions in two corresponding links in the chains 61, 62. This may be achieved as illustrated more clearly in Fig. 2. The chains 61, 62 of the receiving conveyor 33 pass round sprocket wheels 64 carried on support arms 65, and these sprocket wheels 64, as well as the sprocket wheels 22, are shaped in their central region to receive a key member 66. For example, the key member 66 may be in the form of a hexagonal rod and the sprocket wheels 64 and 22 provided with hexagonal bores to receive it. One end of the member 66 is provided with a handle or knob 67 to permit its ready withdrawal, whilst its other end is provided with a retaining means such as a spring-loaded ball 68. Thus, when a unit is placed in position on the base 46, the sprocket wheels 22 and 64 would be axially aligned with one another and the member 66 passed through all four of them so as to ensure that the sprocket wheels 64 and 22 rotate in synchronism and in register with one another, the teeth of each of the sprocket wheels being substantially similarly angularly located wtih respect to the shaped bore of the sprocket wheel.

The conveyors in a unit may be driven in any convenient manner. For example, drive may be transmitted from the receiving conveyor 33 to the delivery conveyor 12 through the member 66. Under certain conditions it may alternatively be preferable for the receiving conveyor 33 to be driven by the delivery conveyor 12 in which case drive may be applied to the conveyors and conveying means in a unit by means of a gear wheel 48 keyed to the shaft 47 and meshing with a gear wheel 57 journalled in the base 46 and driven in any suitable manner by a convenient prime mover. Under other circumstances it may be preferable for the conveyors and conveying means in a unit to be driven by separate prime movers, even though the receiving and delivery conveyors are maintained in synchronism with one another through the key member 66. Under these circumstances it may be desirable for the drive to the receiving conveyor to be at a slightly faster speed than the drive to the delivery conveyor and to include a slipping clutch or the like.

Figure 4:
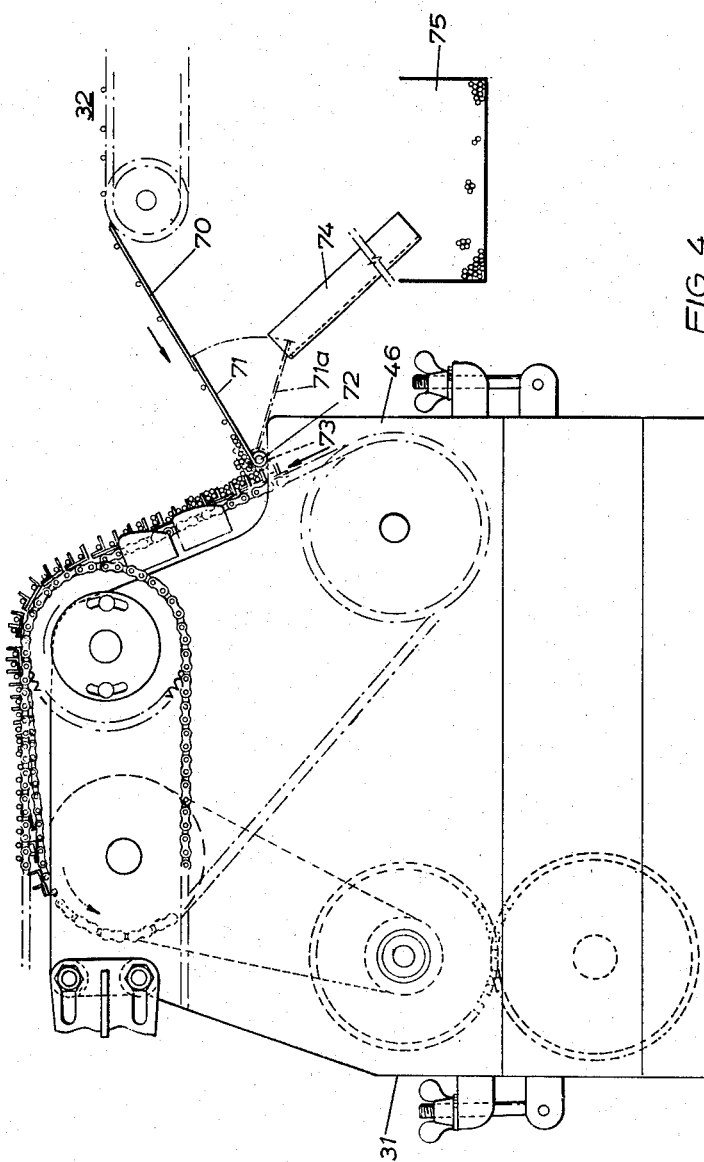
Fig. 4 is a side elevation of part of a modification of the embodiment shown in Figs. 1 to 3.

The provision of the entry conveyor 11 is not essential and in a modified arrangement illustrated in Fig. 4 is replaced by an inclined slide 70 on to which articles may be delivered in any convenient manner such as by the feeding conveyor 32. In order to avoid excessive accumulation of articles at the article receiving station a lower portion 71 of the slide 70 is in the form of a flap which is pivotally mounted at 72 in the region of the article receiving station and is counter-weighted into its normal position in which it is substantially co-linear with the upper part of the slide 70. The flap 71 is counter-weighted by an adjustable spring indicated diagrammatically at 73. If more than a given number of articles collect at the receiving station their weight overcomes the action of the spring 73 and the flap 71 is displaced in a clockwise direction as shown in Fig. 4 into position 71a; any articles thereon are discharged under the action of gravity through a chute 74 into a receptacle 75 from which they may be collected and re-distributed.

I claim:

1. Apparatus for separating and delivering singly a plurality of substantially uniform rod-like articles, comprising a pair of laterally spaced sprocket chains, a plurality of L shaped members attached to each of said sprocket chains to form a plurality of open-ended article receiving compartments thereon, means for driving said sprocket chains along a path including an upwardly inclined portion, means for directing articles to said article receiving compartments at an article receiving station at a low level on said upwardly inclined portion, each of said article receiving compartments being at least large enough to receive one of said articles, two spaced pairs of profiled discharge cams along said inclined portion, and means for adjustably positioning said cams relatively to the paths of said sprocket chains and L shaped members so that the width of the portion of the L shaped members not intersected by said cams is sufficiently large to permit the passage of a single article but not large enough to permit the passage of two or more articles abreast whereby to cause articles in excess of one to be discharged from one article receiving compartment, so that each compartment can thereafter contain only one article and thereby deliver them singly.

2. An interchangeable unit for separating and delivering singly to a receiving conveyor a plurality of substantially uniform rod-like articles received from an article feeder, comprising in combination; upwardly inclined conveying means, means on said conveying means defining a plurality of spaced open-ended article receiving compartments, a downwardly inclined slide for directing articles received from said feeder towards an article receiving station at a low level of said conveying means, two pairs of spaced profiled discharge cams projecting into the path of articles when being moved by said conveying means, means for so positioning said cams relatively to said conveying means that the width of the portion of the path of said means defining said article receiving compartments not intersected by said cams is sufficiently large to permit the passage of a single article but not large enough to permit the passage of two or more articles abreast whereby to discharge from each article receiving compartment articles in excess of one, and means for delivering articles singly from said article receiving compartments to said receiving conveyor.

3. Apparatus for separating and delivering singly a plurality of substantially uniform rod-like articles, comprising conveying means, means on said conveying means defining a plurality of spaced open-ended article receiving compartments, said conveying means being upwardly inclined, a slide for directing articles towards said conveying means at an article receiving station at a low level, a flap pivotally mounted in said slide and forming part of said slide, counterweighting means for normally urging said flap into substantial contiguity with said slide, two pairs of profiled discharge cams projecting into the path of articles when being moved by said conveying means for discharging from each article receiving compartment articles in excess of one.

4. An interchangeable unit for separating and delivering singly to a receiving conveyor a plurality of substantially uniform rod-like articles received from a feed conveyor, comprising in combination upwardly inclined conveying means, means on said conveying means defining a plurality of spaced open-ended article receiving compartments, an entry conveyor for conveying articles received from said feed conveyor towards said article receiving compartments at an article receiving station at a low level of said conveying means, two pairs of spaced profiled discharge cams projecting into the path of articles when being moved by said conveying means, means for so positioning said cams relatively to said conveying means that the width of the portion of the path of said means defining said article receiving compartments not intersected by said cams is sufficiently large to permit the passage of a single article but not large enough to permit the passage of two or more articles abreast whereby to discharge from each article receiving compartment articles in excess of one, and means for delivering articles singly from said article receiving compartments to said receiving conveyor.

5. Apparatus for separating and delivering singly a plurality of substantially uniform rod-like articles, comprising a pair of laterally spaced sprocket chains, a plurality of L shaped members attached to each of said chains to form a plurality of spaced open-ended article receiving compartments thereon, means for driving said chains along a path including an upwardly inclined portion, a slide for directing articles towards said conveying means at an article receiving station at a low level, a flap pivotally mounted in said slide and forming part of said slide, counterweighting means for normally urging said flap into substantial contiguity with said slide, each of said article receiving compartments being at least large enough to receive one of said articles, two spaced pairs of profiled discharge cams along said inclined portion and projecting into the path of articles when being moved by said sprocket chains and so positioned in relation to said sprocket chains and said L shaped members, as to cause articles in excess of one to be discharged from each article receiving compartment and fall away under the action of gravity.

6. An interchangeable unit for separating and delivering singly to a receiving conveyor a plurality of substantially uniform rod-like articles received from article feeding means, comprising in combination, a pair of laterally spaced sprocket chains, a plurality of L shaped members attached to each of said sprocket chains to form a plurality of open-ended article receiving compartments thereon, means for driving said sprocket chains along a path including an upwardly inclined portion and thereafter along a downwardly inclined portion, said pair of sprocket chains and said L shaped members serving as an elevating conveyor, means for directing articles received from said feeding means to said article receiving compartments at an article receiving station at a low level on said upwardly inclined portion, each of said article receiving compartments being at least large enough to receive one of said articles, two spaced pairs of profiled discharge cams along said inclined portion, means for adjustably positioning said cams relatively to the paths of said sprocket chains and L shaped members that the width of the portion of the path of the L shaped members not intersected by said cams is sufficiently large to permit the passage of a single article but not large enough to permit the passage of two or more articles abreast, a second pair of laterally spaced sprocket chains, the spacing between the last mentioned sprocket chains having a predetermined relationship with the spacing between said first mentioned sprocket chains and the pitch of said last mentioned pair of sprocket chains having a predetermined relationship with the spacing between the L shaped members on said first mentioned sprocket chains, said second pair of sprocket chains having a substantially horizontal path and serving as a delivery conveyor for delivering singly articles to said receiving conveyor, said downwardly inclined portion of the path of said first mentioned sprocket chains intersecting said substantially horizontal path of said second mentioned sprocket chains, and means for maintaining in synchronism with one another said first mentioned and said second mentioned pairs of sprocket chains.

7. In apparatus for receiving, separating and delivering singly a plurality of substantially uniform rod-like articles, a receiving conveyor for accepting separated and spaced articles, a feeding conveyor for supplying articles to be separated, a separating unit adapted to be interchangeably received intermediate said receiving and feeding conveyors for co-operation therewith, and means for maintaining synchronism between said receiving conveyor and said unit, said unit comprising a pair of laterally spaced sprocket chains, a plurality of L shaped members attached to each of said sprocket chains to form a plurality of spaced open-ended article receiving compartments thereon, means for driving said sprocket chains along a path including an upwardly inclined portion and thereafter along a downwardly inclined portion, said pair of sprocket chains and said L shaped members serving as an elevating conveyor, means for directing articles to said article receiving compartments at an article receiving station at a low level on said upwardly inclined portion, each of said article receiving compartments being at least large enough to receive one of said articles, two spaced pairs of profiled discharge cams along said inclined portion, means for adjustably so positioning said cams relatively to the paths of said sprocket chains and L shaped members that the width of the path of said L shaped members not intersected by said cams is sufficiently large to permit the passage of a single article but not large enough to permit the passage of two or more articles abreast whereby to cause articles in excess of one to be discharged from one article receiving compartment so that each compartment can thereafter contain only one article and thereby deliver them singly, a second pair of laterally spaced sprocket chains the spacing between the last mentioned sprocket chains having a predetermined relationship with the spacing between said first mentioned sprocket chains and the pitch of said last mentioned pair of sprocket chains having a predetermined relationship with the spacing between the L shaped members on said first mentioned sprocket chains, said second pair of sprocket chains having a substantially horizontal path and serving as a delivery conveyor, said downwardly inclined portion of the path of said first mentioned sprocket chains intersecting said substantially horizontal path of said second mentioned sprocket chains, said receiving conveyor comprising a pair of laterally spaced sprocket chains having substantially the same pitch as said second mentioned sprocket chains serving as said delivery conveyor, and said synchronism maintaining means comprising a pair of sprocket wheels for said chains of said receiving conveyor, a pair of sprocket wheels of substantially the same diameter as said first mentioned sprocket wheels for said second mentioned sprocket chains serving as said delivery conveyor, and a common key member for axially aligning said sprocket wheels with one another and for maintaining said sprocket wheels in synchronism and in register with one another.

8. Apparatus according to claim 7 in which said common key member is in the form of a splined shaft member insertable axially through said sprocket wheels.

9. Apparatus according to claim 7 in which said common key member is a polygonal shaft member insertable through said sprocket wheels.

10. Apparatus comprising in combination; conveying means including means thereon defining a plurality of evenly spaced article-receiving compartments and including in its path an article-receiving station, said path being upwardly inclined therefrom; means for directing articles towards said article-receiving station; a first pair of profiled discharge cams disposed above said article-receiving station and projecting into said upwardly inclined portion of said path for ejecting any articles in excess of two from said article-receiving compartments; and a second pair of profiled discharge cams disposed above said first pair and projecting into said upwardly inclined portion of said path for ejecting any articles in excess of one from said article-receiving compartments.

11. Apparatus comprising in combination; conveying means including means thereon defining a plurality of evenly spaced article-receiving compartments and including in its path an article-receiving station, said path being upwardly inclined therefrom and thereafter having a downwardly inclined portion; means for directing articles towards said article-receiving station; a first pair of profiled discharge cams disposed above said article-receiving station and projecting into said upwardly inclined portion of said path for ejecting any articles in excess of two from said article-receiving compartments; a second pair of profiled discharge cams disposed above said first pair and projecting into said upwardly inclined portion of said path for ejecting any articles in excess of one from said article-receiving compartments; a delivery conveyor, the path of which intersects said downwardly inclined portion of the path of said conveying means, for receiving singly articles remaining in said article-receiving compartments; and means for synchronising movement of said conveying means and of said delivery conveyor.

12. Apparatus comprising in combination; two pairs of sprocket wheels fixed to a common shaft; a first pair of sprocket chains passing over one pair of said sprocket wheels; a plurality of L-shaped members affixed to said first pair of sprocket chains and defining a plurality of evenly spaced article-receiving compartments the path of said article receiving compartments passing through an article receiving station, said path being upwardly inclined therefrom and thereafter having a downwardly inclined portion; means for directing articles towards said article-receiving station; a first pair of profiled discharge cams disposed above said article-receiving station and projecting into the upwardly inclined portion of said path for ejecting any articles in excess of two from said article-receiving compartments; a second pair of profiled discharge cams disposed above said first pair and projecting into the upwardly inclined portion of said path for ejecting articles in excess of one from said article-receiving compartments; and a second pair of spaced sprocket chains passing over the other pair of said sprocket wheels and intersecting said downwardly inclined portion of the path of said article-receiving compartments for receiving singly articles remaining therein.

13. The combination set forth in claim 12 in which one of said pairs of sprocket wheels is angularly adjustable relative to the other of said pairs of sprocket wheels.

References Cited in the file of this patent
UNITED STATES PATENTS

| | | |
|---|---|---|
| 683,039 | Hagen | Sept. 24, 1901 |
| 1,440,744 | Phillippe | Jan. 2, 1923 |
| 2,223,352 | Francisci | Dec. 3, 1940 |
| 2,462,298 | Alexander | Feb. 22, 1946 |
| 2,675,971 | Abbott | Apr. 20, 1954 |
| 2,708,022 | Pettigrew | May 10, 1955 |